(12) United States Patent
Boland

(10) Patent No.: US 9,623,844 B2
(45) Date of Patent: *Apr. 18, 2017

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 184 days.

This patent is subject to a terminal disclaimer.

(21) Appl. No.: 14/111,632

(22) PCT Filed: Apr. 13, 2011

(86) PCT No.: PCT/EP2011/055854
§ 371 (c)(1),
(2), (4) Date: Dec. 4, 2013

(87) PCT Pub. No.: WO2012/139645
PCT Pub. Date: Oct. 18, 2012

(65) Prior Publication Data
US 2014/0082878 A1    Mar. 27, 2014

(51) Int. Cl.
*B60S 1/38* (2006.01)

(52) U.S. Cl.
CPC .......... *B60S 1/3858* (2013.01); *B60S 1/3808* (2013.01); *B60S 1/3877* (2013.01)

(58) Field of Classification Search
CPC .... B60S 1/3856; B60S 1/3858; B60S 1/3849; B60S 1/3851; B60S 1/3853; B60S 1/3808
USPC ...................................... 15/250.32, 250.452
See application file for complete search history.

(56) References Cited

U.S. PATENT DOCUMENTS 5,231,730 A * 8/1993 Schmid et al. .......... 15/250.452
5,802,663 A * 9/1998 Criel ......................... 15/250.452

2007/0113366 A1   5/2007 Walworth et al.
2007/0214593 A1 * 9/2007 Boland ...................... 15/250.23
2008/0263809 A1 * 10/2008 Bousset .................... 15/250.32

(Continued)

FOREIGN PATENT DOCUMENTS

DE           10058208 A1    7/2002
DE        202005012619 U1  10/2005
DE       102008041358 A1 *  2/2010  ............... B60S 1/38

(Continued)

OTHER PUBLICATIONS

Definition of separate in Oxford Dictionary, 2015.*

*Primary Examiner* — Andrew A Horton

(74) *Attorney, Agent, or Firm* — Robert L. Stearns; Dickinson Wright, PLLC

(57) ABSTRACT

A windscreen wiper device of the flat blade type includes an elastic, elongated carrier element, as well as an elongated wiper blade of a flexible material, which can be placed in abutment with a windscreen to be wiped. The wiper blade includes at least one longitudinal groove, in which groove at least one longitudinal strip of the carrier element is disposed. A connecting device is provided for an oscillating arm, wherein the oscillating arm can be pivotally connected to the connecting device about a pivot axis near one end thereto. The connecting device is connected to the flexible material of the wiper blade by at least one pin. The pin cooperates with a recess provided along an exterior edge of the longitudinal strip in order to block any movement of the wiper blade in longitudinal direction thereof relative to the longitudinal strip at the location of the interconnection of the connecting device and the wiper blade.

18 Claims, 11 Drawing Sheets

(56) References Cited

U.S. PATENT DOCUMENTS

2009/0056049 A1*  3/2009  Jarasson et al. ........... 15/250.32
2010/0024149 A1*  2/2010  Erdal ......................... 15/250.32

FOREIGN PATENT DOCUMENTS

| EP | 2236366 A1 | 10/2010 |
| FR | 2868376 A1 | 10/2005 |
| WO | WO-2010016000 A1 | 2/2010 |

\* cited by examiner

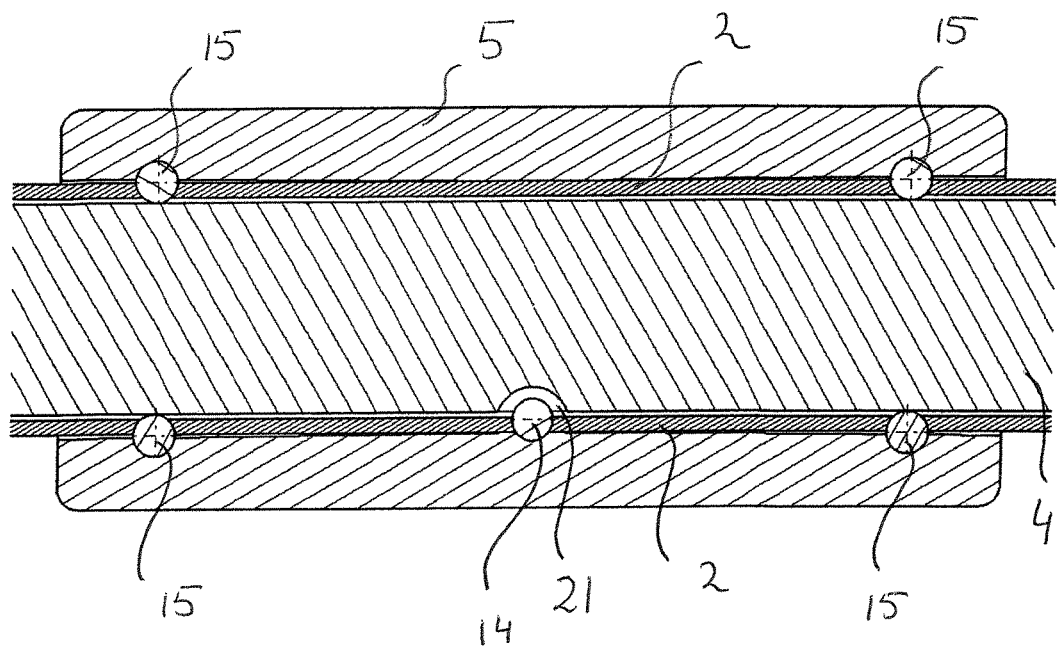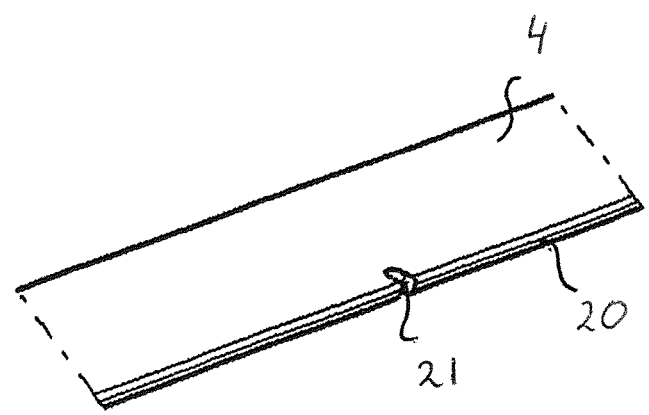
Fig.5

WINDSCREEN WIPER DEVICE

BACKGROUND OF THE INVENTION

1. Technical Field

The present invention relates to a windscreen wiper device of the flat blade type, particularly for automobiles, comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device for an oscillating arm, wherein the oscillating arm can be pivotally connected to the connecting device about a pivot axis near one end thereof. Particularly, the oscillating arm can be pivotally connected to the connecting device with the interposition of a joint part. More in particular, the wiper blade comprises a spoiler at a side thereof facing away from the windscreen to be wiped. The longitudinal groove is preferably a central longitudinal groove accommodating the longitudinal strip. The longitudinal strip is also called a "flexor", while the connecting device is also indicated as a "connector". In the framework of the present invention the connector is preferably made in one piece, also called a "one piece connector".

2. Related Art

Such a windscreen wiper device is generally known. This prior art windscreen wiper device is designed as a so-called "flat blade" or "yokeless blade", wherein no use is made of several yokes pivotally connected to each other, but wherein the wiper blade is biased by the carrier element, as a result of which it exhibits a specific curvature. The spoiler is also called an "air deflector".

SUMMARY OF THE INVENTION

The object of the invention is to provide an improved windscreen wiper device.

In order to accomplish that objective, a windscreen wiper device of the type referred to in the introduction is characterized according to the invention in that the connecting device is connected to the flexible material of the wiper blade by at least one pin, wherein the pin cooperates with a recess provided along an exterior edge of the longitudinal strip in order to block any movement of the wiper blade in longitudinal direction thereof relative to the longitudinal strip at the location of the interconnection of the connecting device and the wiper blade. Advantageously, at least two of such pins are provided on opposite sides of the longitudinal strip, wherein the pins are preferably located opposite one another. In a preferred embodiment the connecting device is connected to the flexible material of the wiper blade by the at least one pin being of a first type and at least one pin of a second type, wherein the pin of the second type is slightly deforming the wiper blade at the location of the interconnection of the connecting device and the wiper blade in order to block any lateral movement of longitudinal strip at the location of the interconnection of the connecting device and the wiper blade. In other words, the pin of the first type ensures that the wiper blade and the longitudinal strip are not allowed to mutually move under the connecting device, but particularly in all other areas along the wiper blade a slight movement thereof is made possible in order to allow the wiper blade to follow any curvature of the windscreen to be wiped. It is this interaction between the pin of the first type and the wiper blade that elastomeric material (i.e. usually rubber) of the wiper blade and material of the longitudinal strip (i.e. usually steel) are forced to engage with each other in a locking manner when the connecting device is finally mounted onto the wiper blade, all at the location under the connecting device. the pin of the first type is mounted inside the recess by stamping the pin of the first type through the flexible material of the wiper blade and inside the recess. the pin of the second type ensures that the so-called "fishtailing phenomenon" is avoided at all times. the wiper blade at the location outside the connecting device would normally suffer from this "fishtailing phenomenon", wherein the wiper blade on opposite sides of the connecting device vibrates in an uncontrollable manner parallel to the windscreen to be wiped. Obviously, the "fishtailing phenomenon" results in deteriorated wiping properties, with all negative consequences involved, particularly at high speeds. the deformation by the pin of the second type is realized at the time of mounting the connecting device onto the wiper blade during assembly of all relevant parts of the wiper blade, wherein the deformation is particularly effected in a side region of the wiper blade, without having any influence on a bottom region thereof (i.e. containing a wiping lip of the wiper blade). Consequently, wiping properties of the wiper blade are not adversely affected. It is noted that the present invention is not restricted to the use of only one longitudinal strip forming the elastic carrier element that is particularly located in a central longitudinal groove of the wiper blade. Instead, the carrier element may also comprise two longitudinal strips, wherein the strips are disposed in opposite longitudinal grooves of the wiper blade. The groove (s) may be closed at one outer end.

In a preferred embodiment of a windscreen wiper device in accordance with the invention the pin of the first type allows movement of the wiper blade in longitudinal direction thereof relative to the longitudinal strip outside the location of the interconnection of the connecting device and the wiper blade. Hence, it is made possible to allow the wiper blade to follow any curvature of the windscreen to be wiped. In another preferred embodiment of a windscreen wiper device according to the invention the pin of the second type is slightly deforming the wiper blade in the form of a C.

Preferably, the pin of the second type exerts a transverse force on the flexible material of the wiper blade, thereby locally squeezing the flexible material onto the longitudinal strip, in order to block any lateral movement of longitudinal strip at the location of the interconnection of the connecting device and the wiper blade. Preferably, no other force than the transverse force is exerted by the pin of the second type.

In another preferred embodiment of a windscreen wiper device in accordance with the invention the pin of the first type and the pin of the second type are separate, i.e. single constructional elements extending in mounted position at least substantially perpendicular to the windscreen to be wiped. The pin of the second type are preferably chamfered in order not to damage the flexible material of the wiper blade. In the alternative or in addition thereto, the pin of the second type is of a softer material than the flexible material of the wiper blade in order not to damage the flexible material of the wiper blade. In the alternative or in addition thereto, the pin of the second type is mounted in a tube in order not to damage the flexible material of the wiper blade.

In another preferred embodiment of a windscreen wiper device according to the invention the connecting device has a substantially U-shaped cross-section, wherein free ends of legs of the U-shaped cross-section extend inwardly so as to form grooves for receiving longitudinal sides of the wiper blade, and wherein the free ends are provided with holes, preferably through holes, for receiving the pins of the first type and of the second type. Particularly, the connecting device is connected to the flexible material of the wiper blade by one pin of the first type interconnecting the connecting device and the wiper blade (by inserting it into a hole of the connecting device) near the middle longitudinal plane of the connecting device perpendicular to the windscreen to be wiped and by two pairs of opposite pins of the second type interconnecting the connecting device and the wiper blade (by inserting them into holes of the connecting device) near the outer ends of the connecting device. More in particular, the connecting device is connected to the flexible material of the wiper blade by one pair of opposite pins of the first type interconnecting the connecting device and the wiper blade near the middle longitudinal plane of the connecting device perpendicular to the windscreen to be wiped and by two pairs of opposite pins of the second type interconnecting the connecting device and the wiper blade near the outer ends of the connecting device. Even more in particular, the connecting device is connected to the flexible material of the wiper blade by one pair of opposite pins of the first type and by one pair of opposite pins of the second type interconnecting the connecting device and the wiper blade near the outer ends of the connecting device. Even more in particular, the connecting device is connected to the flexible material of the wiper blade by two pairs of opposite pins of the first type interconnecting the connecting device and the wiper blade near the outer ends of the connecting device.

In another preferred embodiment of a windscreen wiper device in accordance with the invention the connecting device is pivotally connected to the oscillating arm with the interposition of a joint part, wherein the joint part is detachably connected to the connecting device by engaging protrusions of the connecting device, at the location of the pivot axis, in recesses provided in the joint part. This is preferably realized through a snapping or clipping operation.

In another preferred embodiment of a windscreen wiper device according to the invention the joint part has an at least substantially U-shaped cross-section at the location of its connection to the connecting device, wherein the joint part is provided with a recess provided coaxially with the pivot axis. In particular, the protrusions extend outwards on either side of the connecting device and are preferably cylindrical in shape. In the alternative, the protrusions are spherical or frusto-conical in shape. The protrusions that function as bearing surfaces are thus paced far apart, so that forces exerted thereon will be relatively low. In yet another preferred variant the joint part is provided with co-axial through holes in legs of the U-shaped cross-section thereof, wherein a pivot pin is inserted in the through holes.

In another preferred embodiment of a windscreen wiper device in accordance with the invention the protrusions are provided with co-axial through holes. Accordingly, the wiper blade may then be connected to the oscillating arm on the basis of a so-called "sidelock system". The oscillating arm is provided with a joint pin or a pivot pin to be inserted in the co-axial through holes. The pivot pin protrudes in a direction towards the wiper blade and has a pivot axis extending in a direction of the oscillating movement of the oscillating arm.

In another preferred embodiment of a windscreen wiper device according to the invention the joint part comprises at least one resilient tongue engaging in a correspondingly shaped hole provided in a base of a U-shaped cross-section of the oscillating arm, and wherein the resilient tongue is rotatable along a hinge axis between an outward position retaining the wiper blade onto the oscillating arm and an inward position releasing the wiper blade from the oscillating arm. Accordingly, the wiper blade may then be connected to the oscillating arm on the basis of a so-called "toplock system" on the basis of a bayonet connection. In order to connect the wiper blade onto the oscillating arm, the resilient tongue is initially pushed in against a spring force—as if it were a push button—and then allowed to spring back into the hole provided in the oscillating arm, thus snapping, that is clipping the resilient tongue into the hole. By subsequently pushing in again the resilient tongue against the spring force, the wiper blade may be released from the oscillating arm.

The present invention also refers to a method for manufacturing a windscreen wiper device of the flat blade type, particularly for automobiles, comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device for an oscillating arm, wherein the oscillating arm can be pivotally connected to the connecting device about a pivot axis near one end thereof, characterized in that first a recess is cut along an exterior edge of the longitudinal strip, wherein the connecting device is subsequently mounted onto the wiper blade, wherein the longitudinal strip is subsequently inserted inside the groove, whereinafter at least one pin of the first type and at least one pin of the second type are used, wherein first the pin of the second type is used, the pin of the second type slightly deforming the wiper blade at the location of the interconnection of the connecting device and the wiper blade in order to block any lateral movement of longitudinal strip at the location of the interconnection of the connecting device and the wiper blade;

secondly the pin of the first type is used, the pin of the first type cooperating with the recess provided along the exterior edge of the longitudinal strip in order to block any movement of the wiper blade in longitudinal direction thereof relative to the longitudinal strip at the location of the interconnection of the connecting device and the wiper blade.

Preferably, the connecting device is mounted when the wiper blade is stressed in longitudinal direction away from the connecting device to be mounted. It is noted that in the invention use is made of a mounting head fixed for rotation to a shaft, wherein the shaft is rotatable alternately in a clockwise and in a counter clockwise sense carrying the mounting head into rotation. Thus, in turn the mounting head draws the connecting device into rotation and thereby moves the wiper blade. In the alternative, the mounting head is fixed for translation to a carriage, wherein the carriage can be translated alternately in a one linear direction and in another counter linear direction carrying the mounting head into translation. The present invention can therefore be used for circular or linear movement of the mounting head.

THE DRAWINGS

The invention will now be explained more in detail with reference to figures illustrated in a drawing, wherein FIG. 1 is a perspective, schematic view of a preferred embodiment of a windscreen wiper device according to the invention, with a joint part;

FIG. 5 shows in detail a schematic view from below of the connecting device of FIG. 2, further elucidating the working principle of the mutual fixation of the wiper blade and the longitudinal strip at the location of the connecting device of FIG. 2 according the invention;

DETAILED DESCRIPTION

Figure 1:
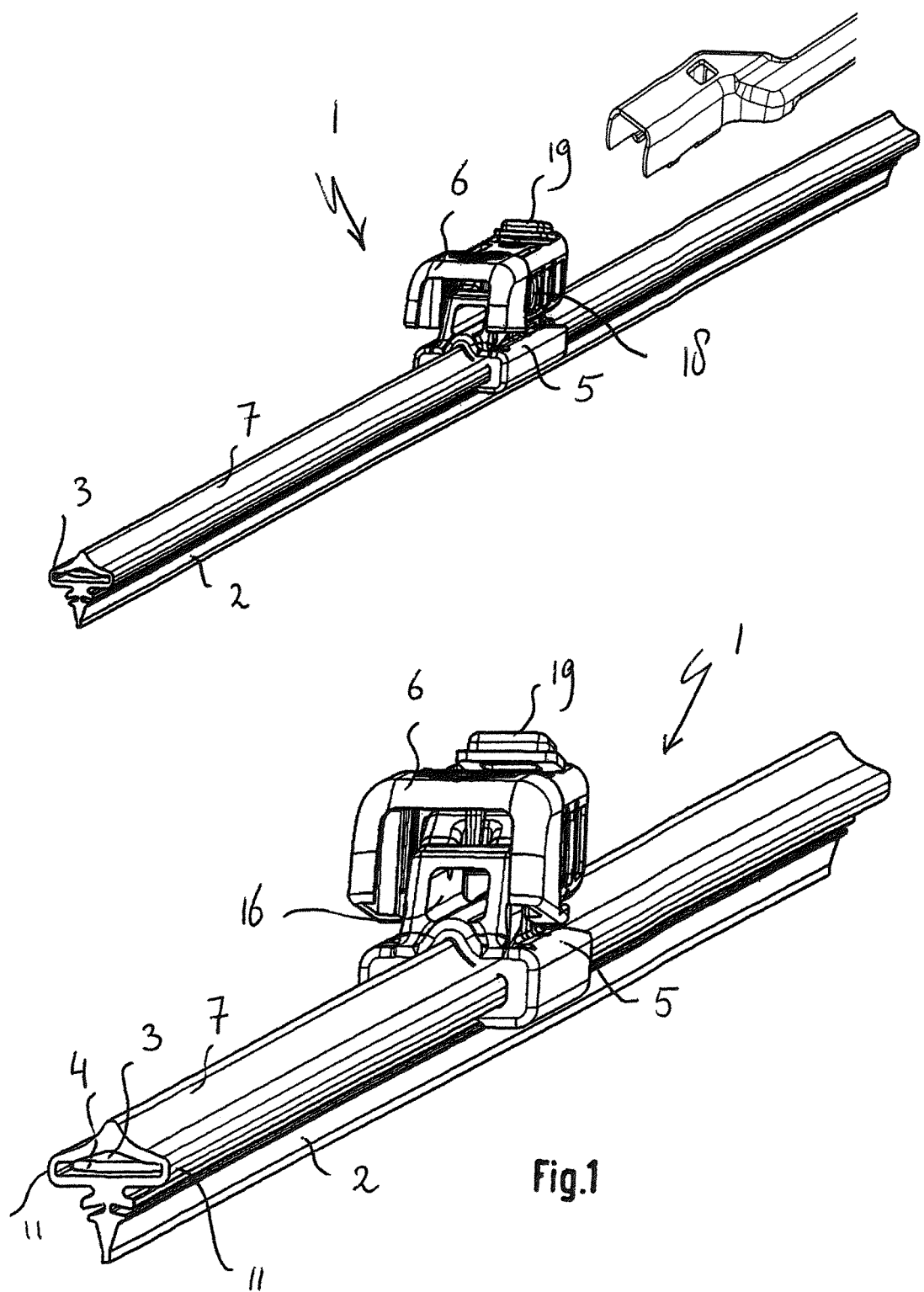

FIG. 1 shows a preferred variant of a windscreen wiper device 1 according to the invention. the windscreen wiper device 1 is built up of an elastomeric wiper blade 2 comprising a central longitudinal groove 3, wherein a longitudinal strip 4 made of spring band steel is fitted in the longitudinal groove 3 (see FIGS. 5, 6 and 7). the strip 4 forms a flexible carrier element for the rubber wiper blade 2, as it were, which is thus biased in a curved position (the curvature in operative position being that of a windscreen to be wiped). The windscreen wiper device 1 is furthermore built up of a connecting device 5 of metal or plastic for connecting an oscillating wiper arm thereto, with the interposition of a joint part 6. The oscillating wiper arm is pivotally connected to the connecting device 5 about a pivot axis near one end. The preferred embodiment of FIG. 1 according to the invention comprises a spoiler or "air deflector" 7 which is made in one piece with the rubber wiper blade 2 and which extends along the entire length thereof. No end caps are used, but free ends of the wiper blade 2 are cut at an oblique angle.

Although not shown in FIG. 1, but fully understood by a skilled person, the oscillating arm is connected to a mounting head fixed for rotation to a shaft driven by a small motor. In use, the shaft rotates alternately in a clockwise and in a counter-clockwise sense carrying the mounting head into rotation also, which in turn draws the oscillating arm into rotation and by means of the connecting device 5 moves the wiper blade 2.

Figure 2:
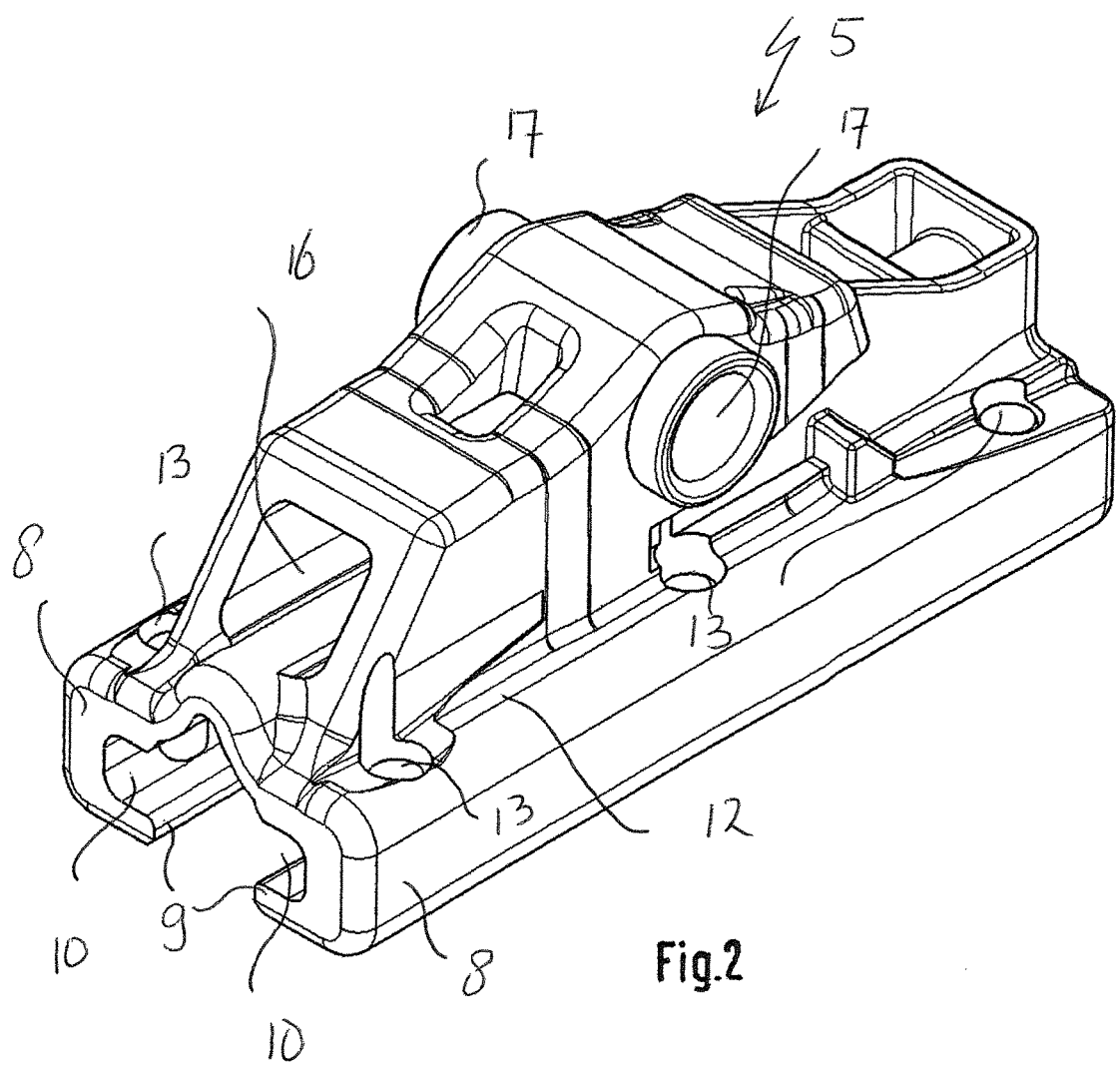
FIGS. 2 through 4 are several perspective, schematic views of a connecting device, as used in a windscreen wiper device of FIG. 1.
Figure 3:
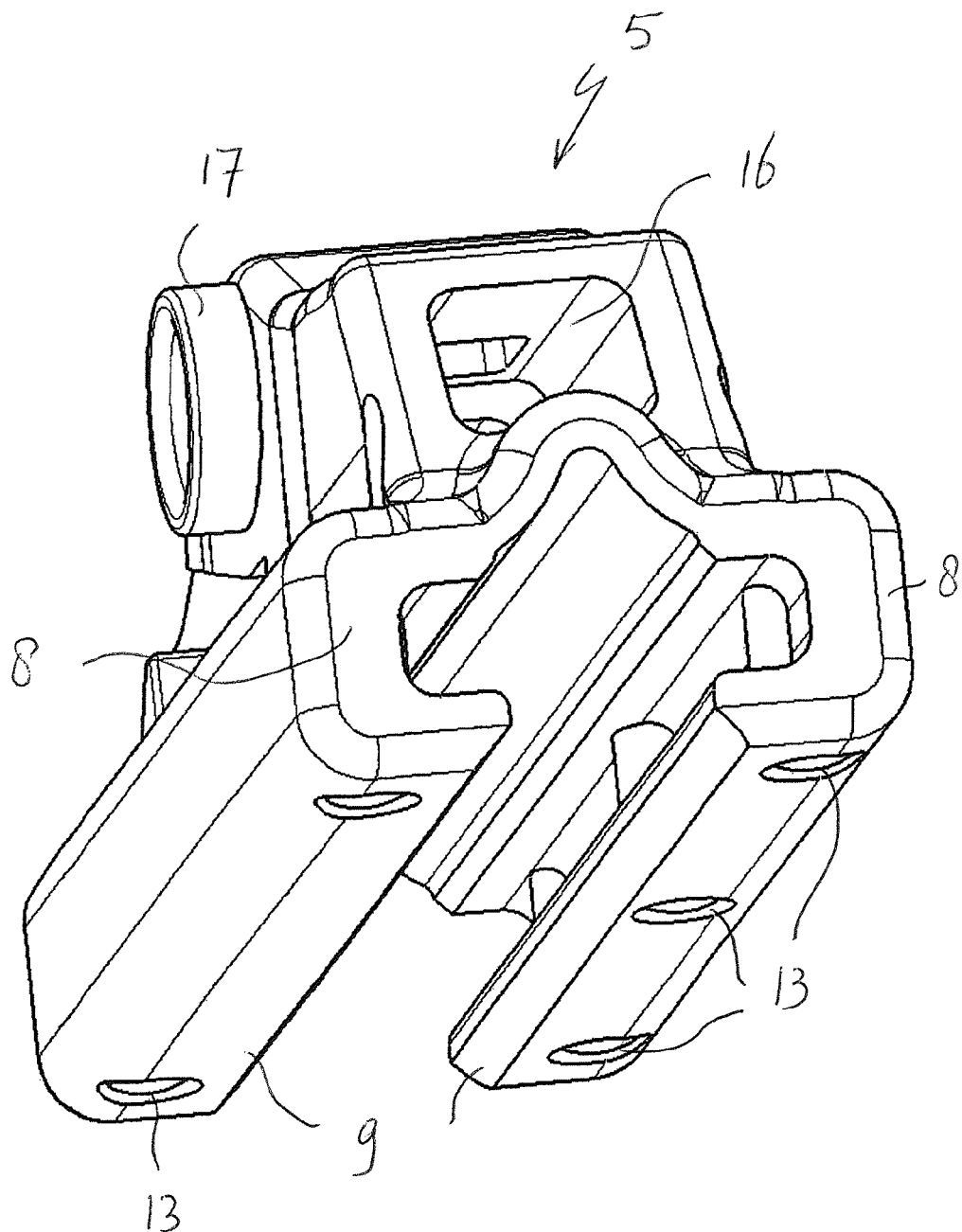
Figure 4:
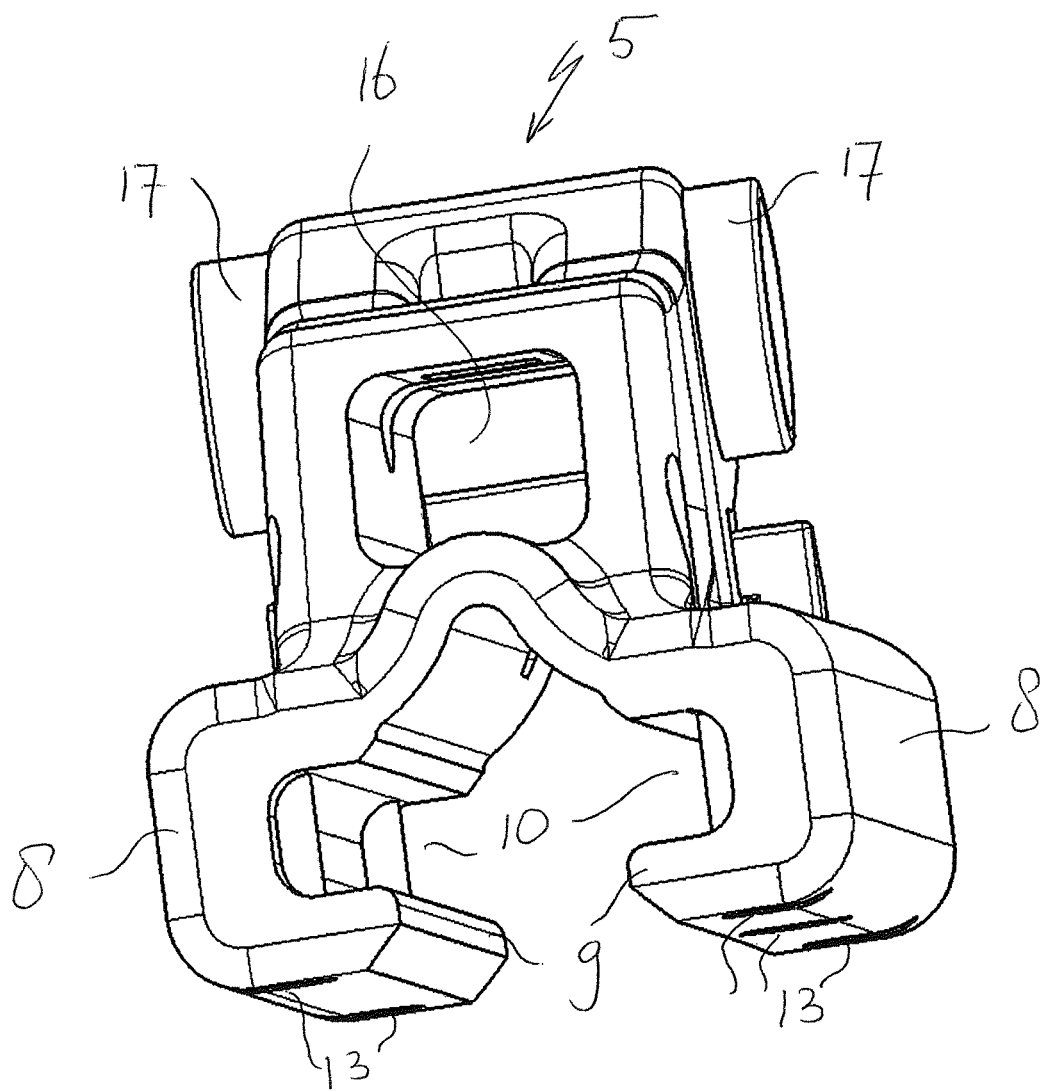

FIGS. 2 through 4 show in perspective several views of a connecting device 5 used in the windscreen wiper device 1 of FIG. 1. As mentioned earlier, this connecting device 5 has a more or less U-shaped cross-section with legs 8. Free ends 9 of the legs 8 of the U-shaped cross-section extend inwardly so as to form grooves or slits 10 for receiving longitudinal sides 11 of the wiper blade 2. The free ends 9 and parallel walls 12 of the connecting device 5 are provided with holes 13 for receiving one pin 14 of the first type and two pairs of opposite pins 15 of the second type, as will be further explained hereunder. The connecting device 5 further comprises an interior space 16 functioning as a water channel extending in longitudinal direction of the connecting device 5. During use the water channel 16 transports rain water therethrough. In other words, in use rain water is carried away from a first side of the connecting device 5 facing away from the free end of the oscillating arm to a second side of the connecting device 5 facing towards the free end of the oscillating arm. As a result of the oscillatory movement of the oscillating arm, in practice an over pressure relative to the environment exists at the location of the first side of the connecting device 5, while an under pressure relative to the environment is present at the location of the second side of the connecting device 5. Due to the over pressure and the under pressure rain water is "automatically" pressed through the water channel.

With reference to FIGS. 1 through 4 the joint part 6 is detachably connected to the connecting device 5 by engaging protrusions 17 of the connecting device 5, at the location of the pivot axis, in co-axial recesses 18 provided in the joint part 6. As shown, the protrusions 17 extend outwards on either side of the connecting device 5. The joint part 6 comprises a resilient tongue 19 extending outwardly, while the oscillating arm has a U-shaped cross-section at the location of its connection to the joint part 6, so that the tongue 19 engages in an identically shaped hole provided in a base of the U-shaped cross-section. The connecting device 5 with the wiper blade 2 is mounted onto the oscillating arm as follows. The joint part 6 being already clipped onto the connecting device 5 is pivoted relative to the connecting device 5, so that the joint part 6 can be easily slided on a free end of the oscillating arm. During this sliding movement the resilient tongue 19 is initially pushed in against a spring force and then allowed to spring back into the hole in the oscillating arm, thus snapping, that is clipping the resilient tongue 19 into the hole of the oscillating arm. This is a so-called bayonet-connection. The oscillating arm together with the joint part 6 may then be pivoted back in a position parallel to the wiper blade 2 in order to be ready for use. By subsequently pushing in again the resilient tongue 19 against the spring force (as if it were a push button), the connecting device 5 and the joint part 6 together with the wiper blade 2 may be released from the oscillating arm. Dismounting the connecting device 5 with the wiper blade 2 from the oscillating arm is thus realized by sliding the connecting device 5 and the joint part 6 together with the wiper blade 2 in a direction away from the oscillating arm.

The longitudinal strip 4, as shown in FIG. 5, is provided along an exterior edge 20 thereof with a recess 21 cooperating with the corresponding pin 14 of the first type. The recess 21 is made through a stamping operation in order to accurately control the shape of the recess 21. In mounted position the wiper blade 2 is allowed to move in longitudinal direction relative to the longitudinal strip 4 outside the location of the interconnection of the connecting device 6 and the wiper blade 2, whereas the pin 14 of the first type ensures that any such longitudinal movement of the wiper blade 2 inside the connecting device 5 is blocked. The pin 14 of the first type locally deforms the rubber. The retention of the wiper blade 2 additionally may also be the result of friction between legs 8 or the connecting device 5 and the rubber of the wiper blade 2.

Figure 6:
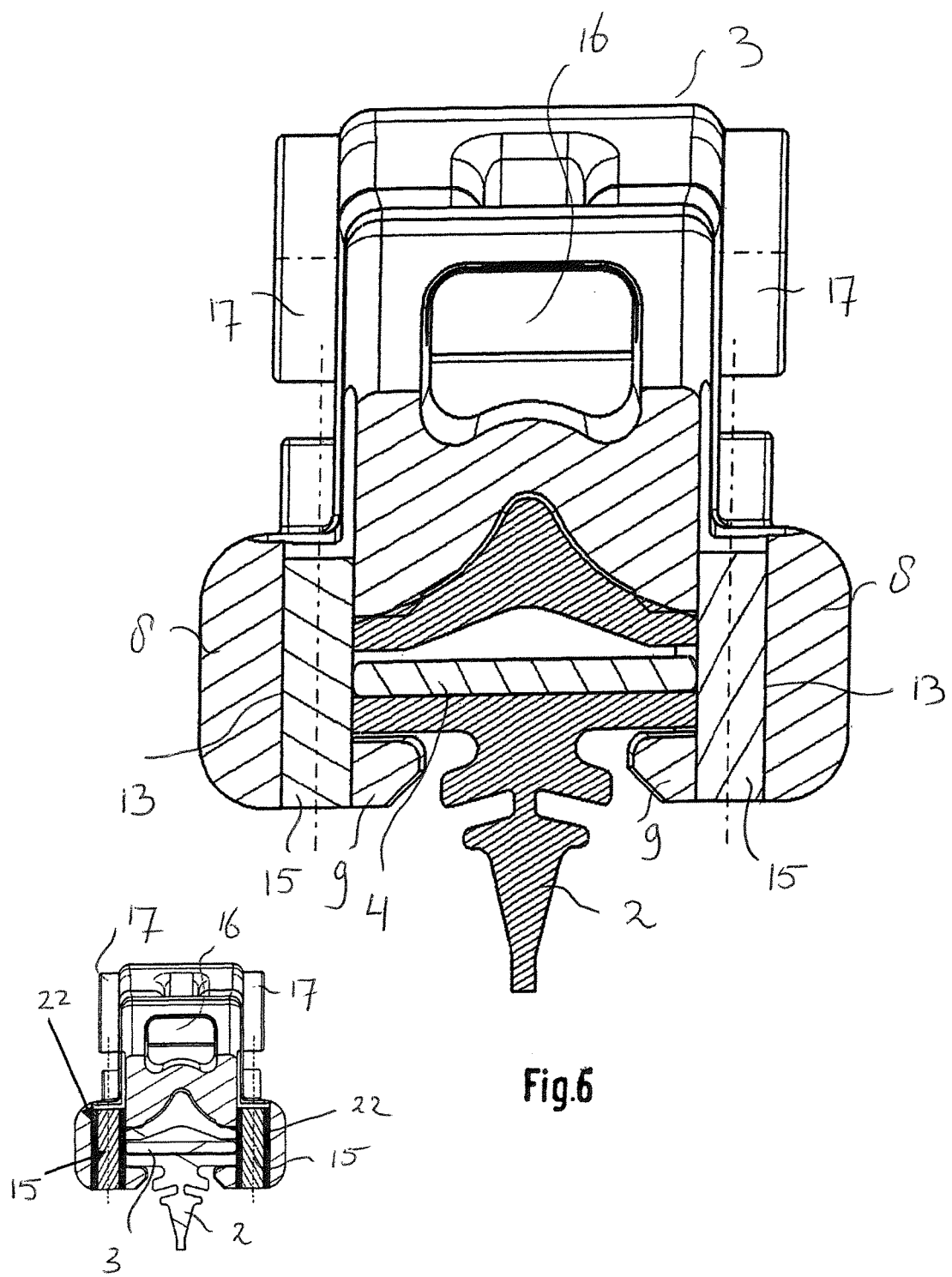
FIG. 6 is a cross-sectional view of the windscreen wiper device of FIG. 1 along the line A-A in FIG. 1.

Referring to FIGS. 5 and 6, in assembled position, the four pins 15 of the second type exert a controllable, predetermined pressure on the rubber material of the wiper blade 2. Thus, any lateral movement between the longitudinal strip 4 and the wiper blade 2 at the location of their interconnection and between the connecting device 5 and the wiper blade 2 at the location of their interconnection is blocked. In use, during each oscillatory movement of the oscillatory arm, the wiper blade 2 at the location outside the connection device 5 would normally suffer from the so-called "fishtailing phenomenon", wherein the wiper blade 2 on opposite sides of the connecting device 5 vibrates in an uncontrollable manner parallel to a windscreen to be wiped. Obviously, this "fishtailing phenomenon" results in deteriorated wiping properties, with all negative consequences involved, particularly at high speeds. Hence, the longitudinal strip 4 is allowed to exhibit a curvature at the location of the interconnection of the connecting device 5 and the wiper blade 2.

Experimental results have shown that the "fishtailing phenomenon" is now avoided according to the invention at least to a large extend.

Figure 7:
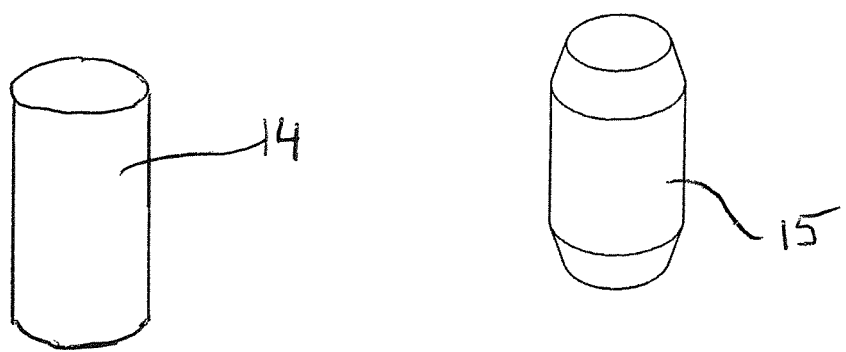
FIG. 7 is a schematic, perspective view of a pin of the first type and of the second type, as used in fixating the wiper blade and the longitudinal strip at the location of the connecting device of FIG. 3.

Referring to FIG. 7, the pins 14 of the first type are cylindrical with sharp edges to locally cut the flexible material of the wiper blade 2, namely at the location of the recess 21. The pins 15 of the second type are preferably chamfered in order not to damage the flexible material of the wiper blade 2. In the alternative or in addition thereto, the pins 15 of the second type are of a softer material than the flexible material of the wiper blade 2 in order not to damage the flexible material of the wiper blade, wherein reference is made to FIG. 7. In the alternative or in addition thereto, the pins 15 of the second type are mounted in a tube 22 of a softer material than the flexible material of the wiper blade 2 in order not to damage the flexible material of the wiper blade.

Figure 8:
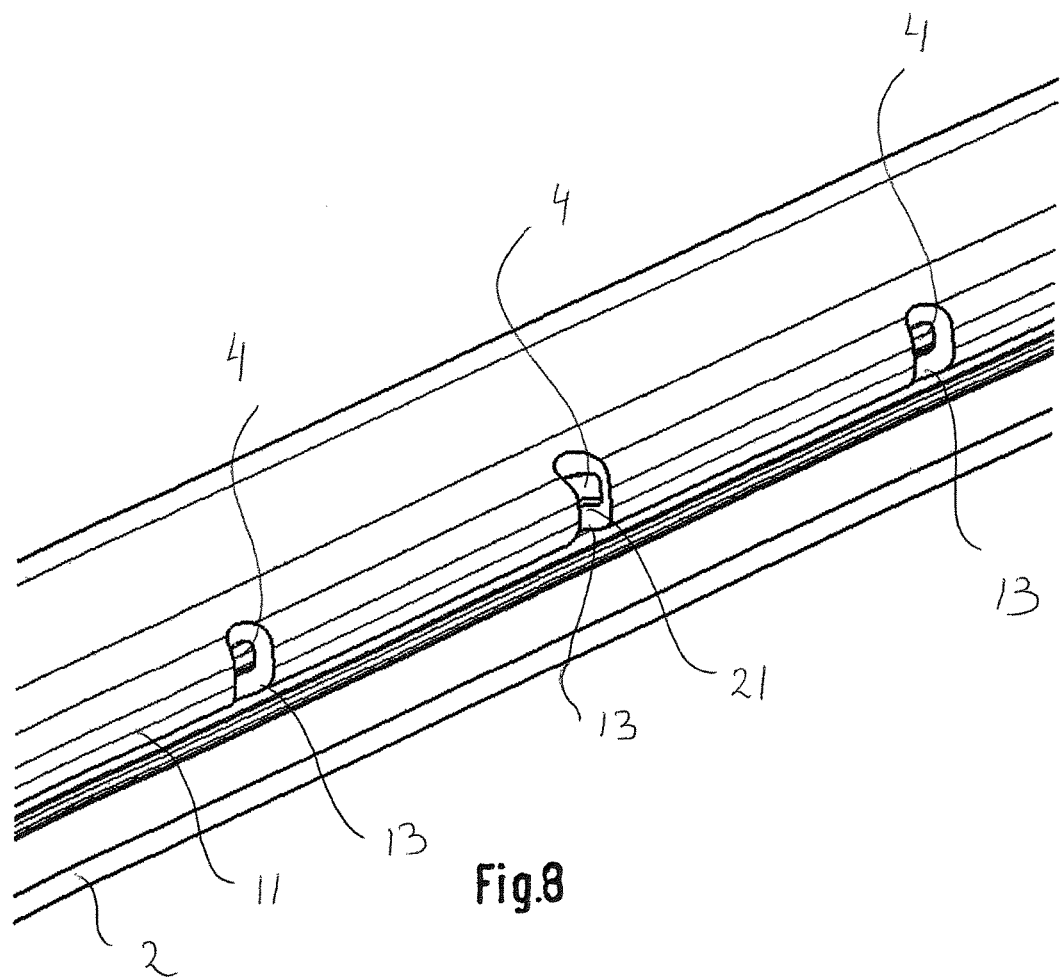
FIG. 8 shows in detail a schematic side view of a dissembled wiper blade, as used in FIG. 1.
Figure 9:
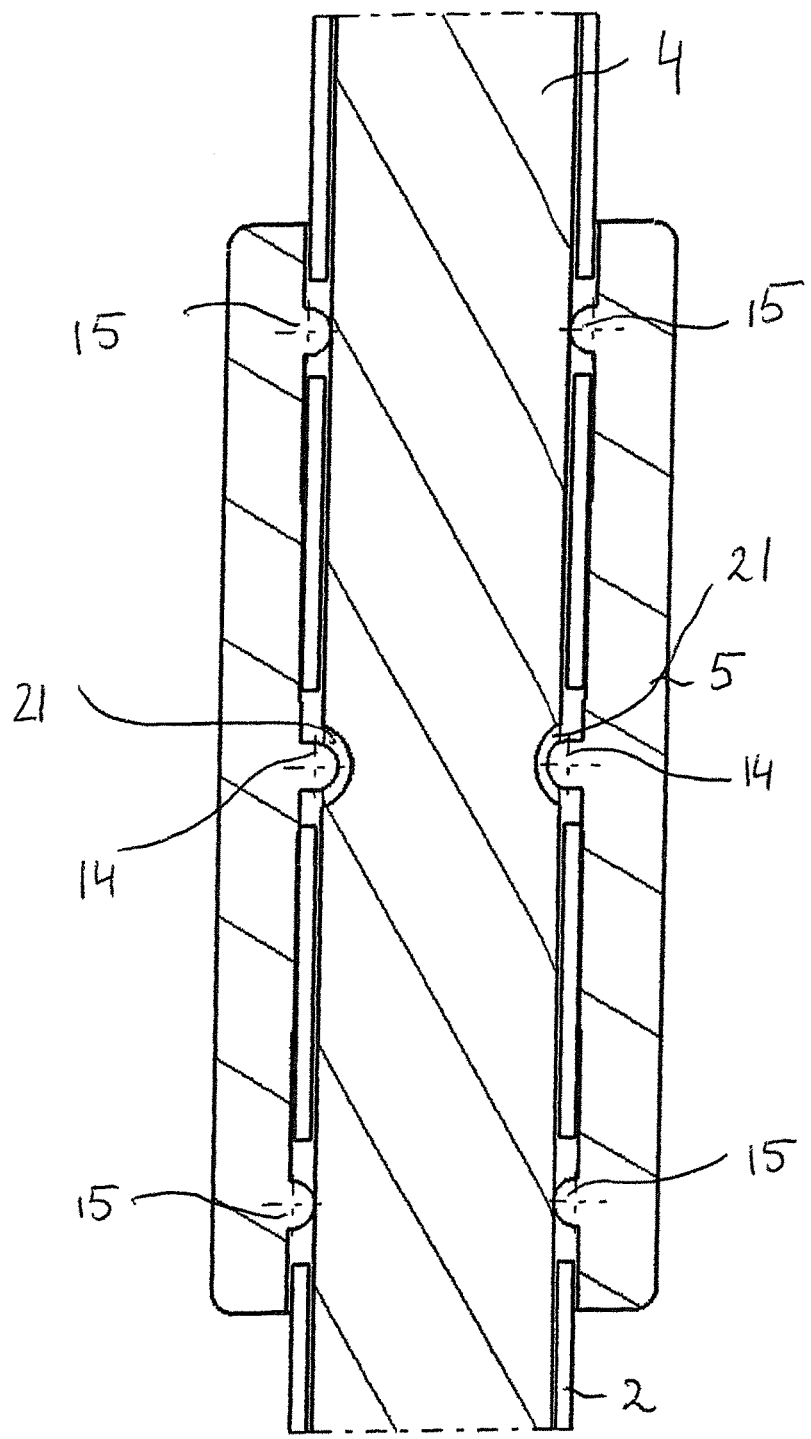
FIGS. 9 through 11 correspond to FIG. 5, but relate to other embodiments of the mutual fixation of the wiper blade and the longitudinal strip at the location of the connecting device.
Figure 10:
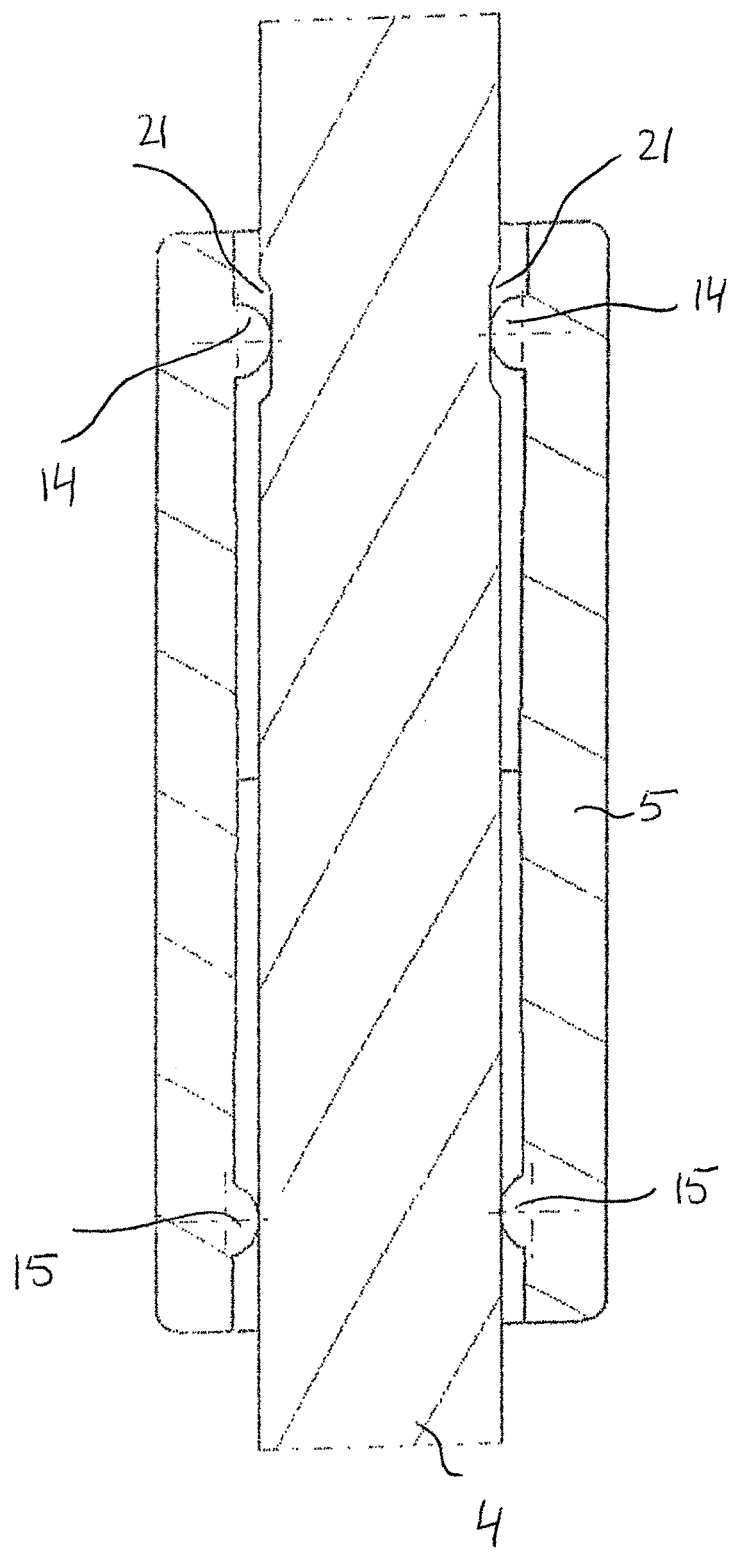
Figure 11:
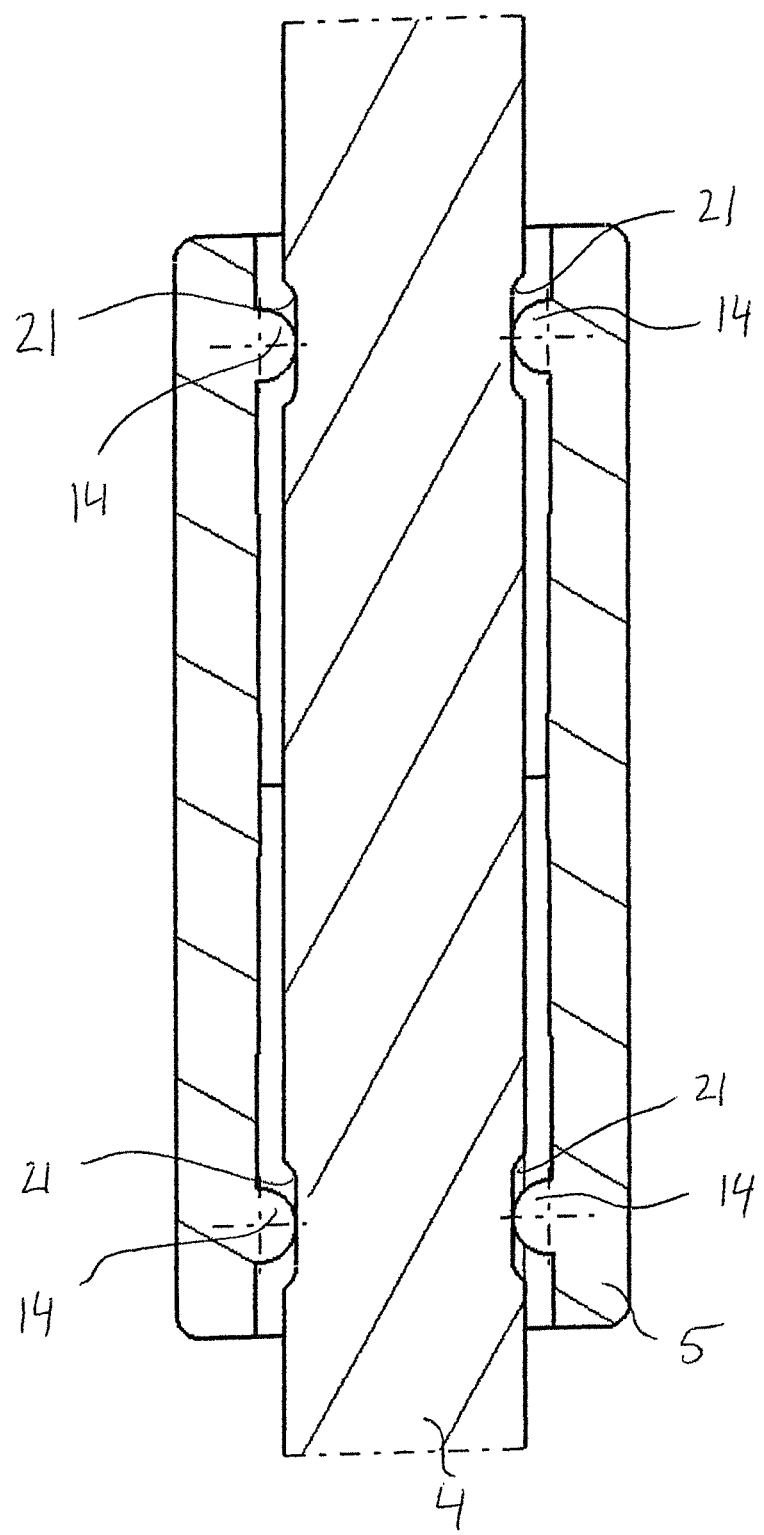

FIG. 8 shows a perspective side view of a longitudinal side 11 of the wiper blade 2, without the pins 14, 15 of the first type and of the second type, but with holes 13 showing the longitudinal strip 4 and its recess 21 for the one pin of the first type. FIGS. 9, 10 and 11 show alternative embodiments compared to the one shown in FIG. 5, wherein the FIGS. 5, 9, 10 and 11 correspond to claims 9, 10, 11 and 12 respectively. A skilled person would, for example, easy understand that the pins of the first type and of the second type could have a round cross-section (elliptical or circular), a rectangular cross-section, or a square cross-section.

The invention is not restricted to the variants shown in the drawing, but it also extends to other preferred embodiments that fall within the scope of the appended claims.

The invention claimed is:

1. A windscreen wiper device of the flat blade type, comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed with the entirety of said at least one strip being contained within said at least one groove, which windscreen wiper device comprises a connecting device for an oscillating arm, wherein the oscillating arm can be pivotally connected to said connecting device about a pivot axis near one end thereof, wherein said connecting device is connected to the flexible material of said wiper blade by at least one pin, wherein said at least one pin cooperates with an associated at least one recess provided along a laterally outwardly facing exterior edge of said longitudinal strip in order to block any movement of said wiper blade in a longitudinal direction thereof relative to said longitudinal strip at the location of the interconnection of said connecting device and said wiper blade, and wherein said at least one pin is constructed as a separate constructional element apart from said connecting device.

2. A windscreen wiper device according to claim 1, wherein said connecting device is connected to the flexible material of said wiper blade by said at least one pin being of a first type and at least one pin of a second type, wherein said pin of the second type is slightly deforming said wiper blade at the location of the interconnection of said connecting device and said wiper blade in order to block any lateral movement of longitudinal strip at the location of the interconnection of said connecting device and said wiper blade.

3. A windscreen wiper device according to claim 2, wherein said pin of the first type allows movement of said wiper blade in the longitudinal direction thereof relative to said longitudinal strip outside the location of the interconnection of said connecting device and said wiper blade.

4. A windscreen wiper device according to claim 3, wherein said pin of the second type is slightly deforming said wiper blade in the form of a C.

5. A windscreen wiper device according to claim 3, wherein said pin of the second type exerts a transverse force on the flexible material of said wiper blade, thereby locally squeezing said flexible material onto said longitudinal strip, in order to block any lateral movement of longitudinal strip at the location of the interconnection of said connecting device and said wiper blade.

6. A windscreen wiper device according to claim 2, wherein said pin of the second type is chamfered in order not to damage the flexible material of said wiper blade.

7. A windscreen wiper device according to claim 2, wherein said connecting device has a substantially U-shaped cross-section, wherein free ends of legs of said U-shaped cross-section extend inwardly so as to form grooves for receiving longitudinal sides of said wiper blade, and wherein said free ends are provided with holes for receiving said pins of the first type and of the second type.

8. A windscreen wiper device according to claim 2, wherein said connecting device is connected to the flexible material of said wiper blade by one pin of the first type interconnecting said connecting device and said wiper blade near the middle longitudinal plane of said connecting device perpendicular to the windscreen to be wiped and by two pairs of opposite pins of the second type interconnecting said connecting device and said wiper blade near the outer ends of said connecting device.

9. A windscreen wiper device according to claim 2, wherein said connecting device is connected to the flexible material of said wiper blade by one pair of opposite pins of the first type interconnecting said connecting device and said wiper blade near the middle longitudinal plane of said connecting device perpendicular to the windscreen to be wiped and by two pairs of opposite pins of the second type interconnecting said connecting device and said wiper blade near the outer ends of said connecting device.

10. A windscreen wiper device according to claim 2, wherein said connecting device is connected to the flexible material of said wiper blade by one pair of opposite pins of the first type and by one pair of opposite pins of the second type interconnecting said connecting device and said wiper blade near the outer ends of said connecting device.

11. A windscreen wiper device according to claim 2, wherein said connecting device is connected to the flexible material of said wiper blade by two pairs of opposite pins of the first type interconnecting said connecting device and said wiper blade near the outer ends of said connecting device.

12. A windscreen wiper device according to claim 11, wherein the protrusions extend outwards on either side of said connecting device.

13. A windscreen wiper device according to claim 1, wherein said connecting device is pivotally connectable with the oscillating arm with the interposition of a joint part, and wherein said joint part is detachably connected to said connecting device by engaging protrusions of said connecting device, at the location of said pivot axis, in recesses provided in said joint part.

14. A windscreen wiper device according to claim 13, wherein said joint part has an at least substantially U-shaped cross-section at the location of its connection to said connecting device.

15. A windscreen wiper device according to claim 13, wherein said protrusions are provided with co-axial through holes.

16. A windscreen wiper device according to 13, wherein said joint part comprises at least one resilient tongue engagable within a correspondingly shaped hole provided in a base of a U-shaped cross-section of the oscillating arm, and wherein said resilient tongue is rotatable along a hinge axis between an outward position for retaining said wiper blade onto the oscillating arm and an inward position for releasing said wiper blade from the oscillating arm.

17. A windscreen wiper device of the flat blade type, comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device for an oscillating arm, wherein the oscillating arm can be pivotally connected to said connecting device about a pivot axis near one end thereof, wherein said connecting device is connected to the flexible material of said wiper blade by at least one pin, wherein said pin cooperates with a recess provided along an exterior edge of said longitudinal strip in order to block any movement of said wiper blade in longitudinal direction thereof relative to said longitudinal strip at the location of the interconnection of said connecting device and said wiper blade wherein said connecting device is connected to the flexible material of said wiper blade by said at least one pin being of a first type and at least one pin of a second type, wherein said pin of the second type is slightly deforming said wiper blade at the location of the interconnection of said connecting device and said wiper blade in order to block any lateral movement of longitudinal strip at the location of the interconnection of said connecting device and said wiper blade, wherein said pin of the second type is of a softer material than the flexible material of said wiper blade in order not to damage the flexible material of said wiper blade.

18. A windscreen wiper device of the flat blade type, comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device for an oscillating arm, wherein the oscillating arm can be pivotally connected to said connecting device about a pivot axis near one end thereof, wherein said connecting device is connected to the flexible material of said wiper blade by at least one pin, wherein said pin cooperates with a recess provided along an exterior edge of said longitudinal strip in order to block any movement of said wiper blade in longitudinal direction thereof relative to said longitudinal strip at the location of the interconnection of said connecting device and said wiper blade, wherein said connecting device is connected to the flexible material of said wiper blade by said at least one pin being of a first type and at least one pin of a second type, wherein said pin of the second type is slightly deforming said wiper blade at the location of the interconnection of said connecting device and said wiper blade in order to block any lateral movement of longitudinal strip at the location of the interconnection of said connecting device and said wiper blade, wherein said pin of the second type is inserted in a tube of a softer material than the flexible material of said wiper blade in order not to damage the flexible material of said wiper blade.

* * * * *